United States Patent
Ventura et al.

(10) Patent No.: US 10,822,538 B2
(45) Date of Patent: Nov. 3, 2020

(54) METHODS OF CONTROLLING FINES MIGRATION IN A WELL

(71) Applicants: Darryl Ventura, Houston, TX (US); Deepak Kumar, Houston, TX (US); Anton Kovalchuk, Houston, TX (US)

(72) Inventors: Darryl Ventura, Houston, TX (US); Deepak Kumar, Houston, TX (US); Anton Kovalchuk, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 197 days.

(21) Appl. No.: 16/044,624

(22) Filed: Jul. 25, 2018

(65) Prior Publication Data
US 2020/0032127 A1    Jan. 30, 2020

(51) Int. Cl.
| | |
|---|---|
| *C09K 8/575* | (2006.01) |
| *E21B 43/02* | (2006.01) |
| *E21B 43/28* | (2006.01) |
| *E21B 43/26* | (2006.01) |

(52) U.S. Cl.
CPC .......... *C09K 8/5756* (2013.01); *E21B 43/025* (2013.01); *E21B 43/26* (2013.01); *E21B 43/28* (2013.01); *C09K 2208/10* (2013.01)

(58) Field of Classification Search
CPC ..... C09K 8/5756; C09K 8/805; E21B 43/025; E21B 43/26
USPC ....................................................... 166/294
See application file for complete search history.

(56) References Cited

U.S. PATENT DOCUMENTS

| | | | |
|---|---|---|---|
| 6,837,316 B2 | 1/2005 | Reddy et al. | |
| 7,178,596 B2 | 2/2007 | Blauch et al. | |
| 7,829,507 B2 | 11/2010 | Todd et al. | |
| 7,897,546 B2 | 3/2011 | Showalter et al. | |
| 8,470,747 B2 | 6/2013 | Welton et al. | |
| 9,611,420 B2* | 4/2017 | George | C09K 8/512 |
| 9,758,396 B2 | 9/2017 | Berg et al. | |
| 10,323,174 B2* | 6/2019 | Guan | C09K 8/528 |
| 10,421,894 B2* | 9/2019 | Johnson | C09K 8/512 |
| 2010/0032160 A1* | 2/2010 | Wilson | C09K 8/516 166/282 |
| 2012/0178651 A1 | 7/2012 | Huang | |
| 2014/0000891 A1* | 1/2014 | Mahoney | C09K 8/805 166/280.2 |
| 2014/0329724 A1 | 11/2014 | George et al. | |
| 2016/0137905 A1 | 5/2016 | Patil et al. | |

(Continued)

OTHER PUBLICATIONS

"Chitosan high molecular weight", retrieved from the internet Jun. 26, 2018 [https://www.sigmaaldrich.com/catalog/product/aldrich/419419?lang=en&region=US&gclid=EAlalQobChMI8pCQpovE2glVTSWBCh1egAxDEAAYASAAEgL_JfD_BwE] 4 pages.

(Continued)

*Primary Examiner* — Angela M DiTrani Leff
*Assistant Examiner* — Ashish Varma
(74) *Attorney, Agent, or Firm* — Cantor Colburn LLP

(57) ABSTRACT

A method of treating a subterranean formation penetrated by a wellbore comprises introducing into the subterranean formation a treatment fluid comprising encapsulated particles having a core of a crosslinking agent and a shell of a chitosan encapsulant disposed on the core; releasing the crosslinking agent from the encapsulated particles with an acid; reacting the released crosslinking agent with the chitosan encapsulant or a derivative thereof forming a polymerized chitosan; and consolidating a plurality of particles in the subterranean formation with the polymerized chitosan.

23 Claims, 2 Drawing Sheets

(56) References Cited

U.S. PATENT DOCUMENTS

2018/0105463 A1    4/2018  Zampini et al.
2018/0127645 A1*   5/2018  Chopade ................ C09K 8/805

OTHER PUBLICATIONS

Dong et al. "Scalable ionic gelation synthesis of chitosan nanoparticles for drug delivery in static mixers", Carbohydrate Polymers 94 (2013) 940-945.

Dutta et al. "Perspectives for chitosan based antimicrobial films in food applications", Food Chemistry 114 (2009) 1173-1182.

Esser-Kahn, et al. "Triggered Release from Polymer Capsules", Macromolecules 2011, 44, 5539-5553.

Kim et al. "Properties of Chitosan Films as a Function of pH and Solvent Type", Journal of Food Science E: Food Engineering and Physical Properties 71:3 (2006), pp. 119-124.

Lee et al. "Strong Adhesion and Cohesion of Chitosan in Aqueous Solutions", Langmuir 2013, 29, 14222-14229.

Shu et al. "Chitosan/gelatin microspheres prepared by modified emulsification and ionotropic gelation", j. microencapsulation, 2001, vol. 18, No. 2, 237-245.

Yamaguchi et al. "The chitosan prepared from crab tendon I: the characterization and the mechanical properties", Biomaterials 24 (2003) 2031-2036.

Zhou et al. "Acidic ionic liquid catalyzed crosslinking of oxycellulose withchitosan for advanced biocomposites", Carbohydrate Polymers 113 (2014) 108-114.

International Search Report for International Application No. PCT/US2019/038380, International Filing Date Jun. 21, 2019, dated Sep. 23, 2019, 7 pages.

Written Opinion for International Application No. PCT/US2019/038380, International Filing Date Jun. 21, 2019, dated Sep. 23, 2019, 6 pages.

* cited by examiner

METHODS OF CONTROLLING FINES MIGRATION IN A WELL

BACKGROUND

The disclosure is directed to methods of treating subterranean formations. More specifically, the disclosure relates to methods of controlling fines migration in a well.

During well stimulation, completion, and production operations, clays, sand, micas, feldspars, plagioclase, or other fine particles may be generated. Fines may result from an unconsolidated or inherently unstable formation, or from the use of an incompatible treatment fluid that liberates fine particles. Other sources of fines include particulates added to the wellbore such as fines present in a proppant or produced from partially crushed proppant.

Once generated, formation fines may migrate toward the near wellbore area due to drag or other forces. The migrated fines can plug, erode or cause significant wear of downhole equipment and surface facilities. The fines can also plug or clog flow channels in the formation, thereby significantly reducing well productivity. Thus it would be desirable to provide a method to fix or stabilize fines within a subterranean formation so that fines migration is reduced or substantially prevented.

SUMMARY

A method of treating a subterranean formation penetrated by a wellbore comprises introducing into the subterranean formation a treatment fluid comprising encapsulated particles having a core of a crosslinking agent and a shell of a chitosan encapsulant disposed on the core; releasing the crosslinking agent from the encapsulated particles with an acid; reacting the released crosslinking agent with the chitosan encapsulant or a derivative thereof forming a polymerized chitosan; and consolidating a plurality of particles in the subterranean formation with the polymerized chitosan.

BRIEF DESCRIPTION OF THE DRAWINGS

The following descriptions should not be considered limiting in any way. With reference to the accompanying drawings, like elements are numbered alike.

DETAILED DESCRIPTION

It has been found that a polymerized chitosan generated in situ in a subterranean formation can effectively consolidate formation fines thus minimizing or avoiding the problems associated with fines migration. In particular, the inventors have found that encapsulated particles having a core of a crosslinking agent and a shell of a chitosan encapsulant can be conveniently pumped downhole due to the low viscosity of the encapsulated particles. Once introduced downhole, the shell of the encapsulated particles can be broken in an acidic environment releasing the crosslinking agent. The released crosslinking agent reacts with the chitosan encapsulant or a derivative thereof forming a polymerized chitosan in situ. Advantageously, the polymerized chitosan forms a film on the surface of various formation particles, either introduced to the formation or generated from the formation, consolidating the otherwise loose formation particles to prevent or reduce the tendency of these particles to migrate toward the near wellbore area.

Figure 1:
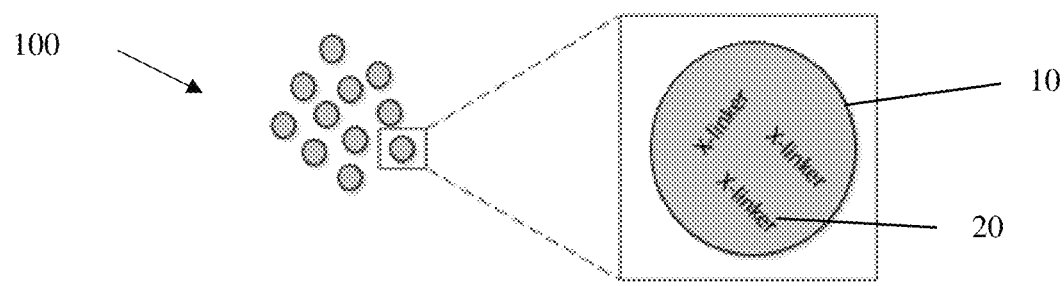
FIG. 1 illustrates an exemplary encapsulated particle having a core of a crosslinking agent and a shell comprising a chitosan encapsulant according to an embodiment of the disclosure.

As shown in FIG. 1, the encapsulated particles (100) having a core (20) of a crosslinking agent and a shell (10) of a chitosan encapsulant disposed on the core. The crosslinking agent comprises an oxycellulose, a tripolyphosphate, a sulfate, a citrate, or a combination comprising at least one of the foregoing. Exemplary sulfates include dextran sulfate, ammonium sulfate, sodium sulfate, and potassium sulfate. Exemplary citrates include sodium citrate, aluminum citrate, potassium citrate, starch citrate, and ammonium citrate.

The chitosan encapsulant is pH sensitive, and is configured to release the crosslinking agent in an acidic environment by breaking the physical bonds, or chemical bonds, or a combination thereof on the polymer chains of the chitosan encapsulant and/or between the polymer chains of the chitosan encapsulant.

Chitosan is a biopolymer composed of N-acetylglucosamine and glucosamine units. Chitosan can be functionalized to incorporate various functional groups. Exemplary functional groups include carboxylic acids, alkenyl groups, alkyl groups, carbonyl groups, and the like. As used herein, chitosan includes non-functionalized chitosan, functionalized chitosan, or a combination thereof Examples of chitosan encapsulants include crosslinked chitosan such as an oxycellulose crosslinked chitosan, a tripolyphosphate crosslinked chitosan, a sulfate crosslinked chitosan, a citrate crosslinked chitosan, or a combination comprising at least one of the foregoing.

The encapsulated particles may have different sizes, shapes and surface morphology. The shapes include spherical, tubular, or the like. The encapsulated particles can also be amorphous. The particles can have an average particle size of about 10 nm to about 2 microns, or about 2 microns to about 75 microns, or about 75 microns to about 200 microns. As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. The encapsulated particles can have a core/shell structure, and the thickness of the shell is about to about 5 nm to about 100 nm or about 10 nm to about 50 nm or about 5 nm to about 15 nm.

The encapsulated particles can be produced by various synthesis approaches like sol-gel, reverse micelle, and the like. Exemplary methods are described by Esser-Khan et al. in Macromolecules, 2011, 44 (14), p. 5539-5553 or by Dong et al. in Carbohydrate Polymers, 2013, 94(2), p. 940-945.

The coated polymeric particles can be introduced into the subterranean formation through a treatment fluid. The treatment fluid can comprise about 0.5 to about 70 wt %, preferably about 20 to about 60 wt %, more preferably about 40 to about 50 wt % of the encapsulated particles.

The treatment fluid can further comprise a carrier fluid. The carrier fluid is present in an amount of about 10% to about 99% by weight, more specifically in an amount of about 20% to about 99% by weight, based on the total weight of the treatment fluid. The carrier fluid can be an oil-based carrier fluid or an aqueous-based carrier fluid. The aqueous carrier fluid can be fresh water, brine (including seawater), an aqueous base, or a combination comprising at least one of the foregoing. It will be appreciated that other polar liquids such as alcohols and glycols, alone or together with water, can be used in the carrier fluid.

The brine can be, for example, seawater, produced water, completion brine, or a combination comprising at least one of the foregoing. The properties of the brine can depend on the identity and components of the brine. Seawater, for example, can contain numerous constituents including sulfate, bromine, and trace metals, beyond typical halide-containing salts. Produced water can be water extracted from a production reservoir (e.g., hydrocarbon reservoir) or produced from an underground reservoir source of fresh water or brackish water. Produced water can also be referred to as reservoir brine and contain components including barium, strontium, and heavy metals. In addition to naturally occurring brines (e.g., seawater and produced water), completion brine can be synthesized from fresh water by addition of various salts for example, KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. The above brines can be modified to include one or more additional salts. The additional salts included in the brine can be NaCl, KCl, NaBr, $MgCl_2$, $CaCl_2$, $CaBr_2$, $ZnBr_2$, $NH_4Cl$, sodium formate, cesium formate, and combinations comprising at least one of the foregoing. The NaCl salt can be present in the brine in an amount of about 0.5 to about 25 weight percent (wt. %), specifically about 1 to about 15 wt. %, and more specifically about 3 to about 10 wt. %, based on the weight of the brine.

The treatment fluid can have a pH of greater than or equal to about 6, greater than or equal to about 6.5, or greater than or equal to about 7. The viscosity of the treatment fluid can be varied over a wide range such as an apparent viscosity (AV) from about 5 to about 800 centiPoise (cP) or about 10 to about 100 cP when measured with a benchtop viscometer such as an Ofite M900 rheometer at 23° C. at 300 revolutions per minute (rpm) and performed according to American Petroleum Institute standard API RP-39.

The treatment fluid can be used to reduce or substantially prevent the migration of fines in the subterranean formation and can be used in vertical, horizontal, or deviated wellbores. Due to the low viscosity of the treatment fluid, the encapsulated particles can be pumped further than the viscous furan used in the art to control fine migration.

In general, the components of the treatment fluid can be premixed or is injected into the wellbore without mixing, e.g., injected "on the fly" where the components are combined as they are being injected downhole. A pumpable or pourable treatment fluid can be formed by any suitable method. In an exemplary embodiment, the components of the treatment fluid are combined using conventional mixing equipment or equipment used in downhole operations. The treatment fluid can then be injected, e.g., pumped and placed by various conventional pumps and tools to any desired location within the wellbore. In an embodiment, injecting the treatment fluid comprises pumping the fluid via a tubular in the wellbore. For example, the treatment fluid can be pumped into an annulus between a tubular and a wall of the wellbore via the tubular.

Figure 2:
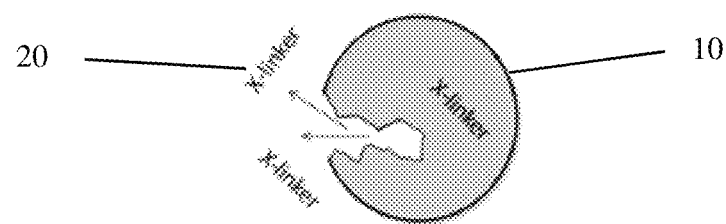
FIG. 2 illustrates the release of the crosslinking agent of FIG. 1 from the chitosan encapsulant.

Once the treatment fluid has been placed in the desired location, for example on a surface of the subterranean formation or within the subterranean formation, the shell of the encapsulated particles is allowed to be broken with an acid releasing the crosslinking agent. FIG. 2 illustrates the release of the crosslinking agent of FIG. 1 from the chitosan encapsulant. Examples of the acid includes hydrochloric acid, acetic acid, formic acid, lactic acid, sulfuric acid, nitric acid, or a combination comprising at least one of the foregoing. The acid can be pumped into the subterranean formation after the treatment fluid is introduced downhole. The concentration of the acid pumped downhole can be about 5 to about 30%, preferably about 10 to about 25%, more preferably about 15 to about 20%. Alternatively, the acid can be pumped into the subterranean formation before the treatment fluid is introduced downhole. It is appreciated that if the formation already has an acidic environment that is effective to break the shell of the encapsulated particles, no acids need to be introduced separately into the subterranean formation.

As used herein, breaking the shell means breaking the physical bonds, or chemical bonds, or a combination thereof between or on the polymer chains of the chitosan encapsulant. The released crosslinking agent reacts with the chitosan encapsulant or a derivative thereof forming a polymerized chitosan. As used herein, a derived thereof includes degraded products produced from the chitosan encapsulant when the shell is broken. Such derivatives include chitosan monomers, chitosan oligomers, uncrosslinked chitosan, partially crosslinked chitosan, or a combination comprising at least one of the foregoing.

Figure 3:
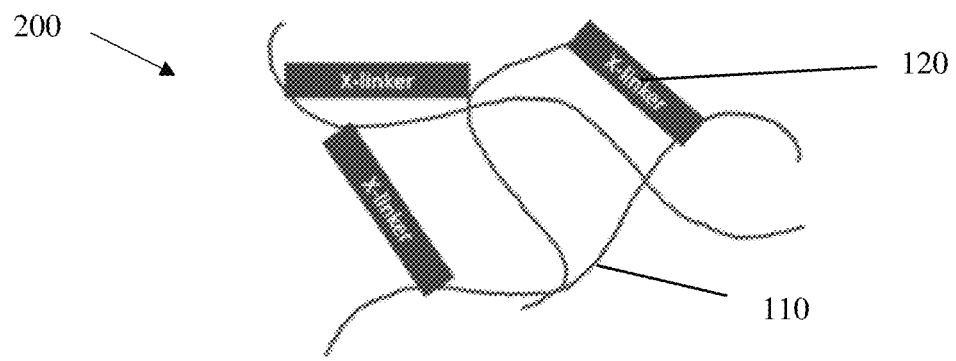
FIG. 3 illustrates an exemplary structure of a polymerized chitosan generated in situ in a subterranean formation.

In an embodiment, the acid can facilitate the reaction between the crosslinking agent and the chitosan encapsulant or a derivative thereto to form the polymerized chitosan in situ. In other words, with the presence of the acid that breaks the shell of the encapsulated particles, polymerized chitosan can be produced at a faster rate. As used herein, polymerized chitosan includes, but is not limited to crosslinked chitosan. FIG. 3 illustrates an exemplary structure of a polymerized chitosan generated in situ in a subterranean formation. As shown in FIG. 3, a polymerized. chitosan (200) includes chitosan polymer chains (110) crosslinked by the crosslinking agent (120) released from the encapsulated particles.

If needed, after introducing the treatment fluid and activating acid into the well, the well is shut-in for a period of time to allow the polymerized chitosan to form. During this time the well is closed off so that nothing is introduced into the well. Exemplary shut-in times include a few hours (e.g., 0.5 to 24 hours) to a few (e.g., 2 to 5) days.

The particles in the formation that can be consolidated with the polymerized chitosan generated in situ include proppant particles introduced into the formation or derivatives thereof such as crushed proppant particles, particles generated from the formation, or a combination comprising at least one of the foregoing. Particles generated from the formation are not particularly limited. For example, particles may result from an unconsolidated or inherently unstable formation, or from the use of an incompatible treatment fluid that liberates fine particles. Exemplary particles in the formation comprise sand, gravel, crushed stone, slag, recycled concrete, silica, grass spheres, limestone, feldspar, ceramics, or a combination comprising at least one of the foregoing.

The particles in the formation can have a water-wet surface or an oil-wet surface. In the event that the particles have a water-wet surface the treatment fluid can include an aqueous-based carrier. When the particles have an oil-wet surface the treatment fluid can have an oil-based carrier.

Figure 4:
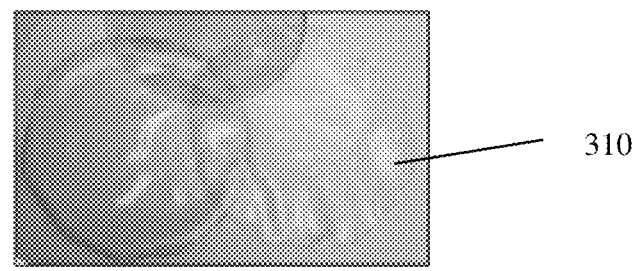
FIG. 4 illustrates an exemplary film formed of a polymerized chitosan generated in situ in a subterranean formation.
Figure 5:
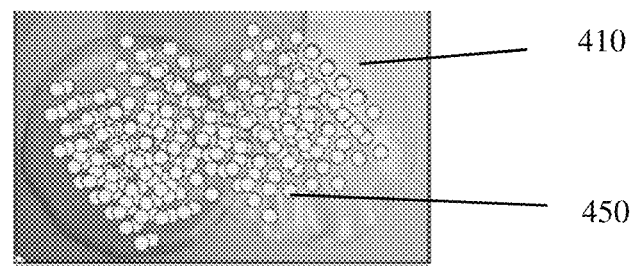
FIG. 5 illustrates the consolidation of formation fines on the films formed from in-situ generated polymerized chitosan.
Figure 6:
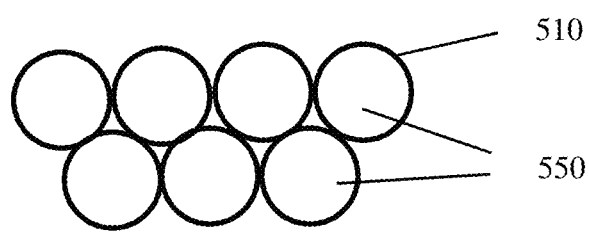
FIG. 6 is a cross-sectional view of an exemplary embodiment of consolidated formation particles.

Advantageously, the polymerized chitosan forms a film on a surface of the plurality of particles in the subterranean formation thus consolidating the plurality of particles together. An exemplary film (310) is shown in FIG. 4. FIGS. 5 and 6 illustrate the consolidation of formation fines (450, 550) on the films (410, 510) formed from in-situ generated polymerized chitosan. The consolidated particles are less likely to migrate to the near wellbore locations.

The treatment fluid can be introduced into the subterranean formation during a workover operation. In desired, the method can further include pumping a cleaning composition to clean the subterranean formation prior to introducing the treatment fluid comprising the encapsulated particles. An exemplary cleaning composition comprises about 10 to about 20 vol. % of hydrochloric acid.

The coated polymeric particles can be introduced into the subterranean formation through a treatment fluid during, before, or after a downhole operation such as a hydraulic fracturing operation; an acidizing treatment; a gravel packing operation; a flooding operation; or a combination comprising at least one of the foregoing.

In an exemplary embodiment, after an acidizing treatment or other well stimulation or remediation operations, a treatment fluid containing encapsulated particles can be introduced into the subterranean formation to consolidate formation fines and substantially preventing the passage of formation particles from the subterranean formation into the wellbore.

Set forth below are various embodiments of the disclosure.

Embodiment 1. A method of treating a subterranean formation penetrated by a wellbore, the method comprising: introducing into the subterranean formation a treatment fluid comprising encapsulated particles having a core of a crosslinking agent and a shell of a chitosan encapsulant disposed on the core; releasing the crosslinking agent from the encapsulated particles with an acid; reacting the released crosslinking agent with the chitosan encapsulant or a derivative thereof forming a polymerized chitosan; and consolidating a plurality of particles in the subterranean formation with the polymerized chitosan.

Embodiment 2. The method as in any prior embodiment, wherein the crosslinking agent comprises an oxycellulose, a tripolyphosphate, a sulfate, a citrate, or a combination comprising at least one of the foregoing.

Embodiment 3. The method as in any prior embodiment, wherein the acid breaks the shell of the chitosan encapsulant thus releasing the crosslinking agent.

Embodiment 4. The method as in any prior embodiment, wherein the acid is pumped downhole before the treatment fluid is introduced into the subterranean formation.

Embodiment 5. The method as in any prior embodiment, wherein the acid is pumped downhole after the treatment fluid is introduced into the subterranean formation.

Embodiment 6. The method as in any prior embodiment, wherein the acid comprises hydrochloric acid, acetic acid, formic acid, lactic acid, sulfuric acid, nitric acid, or a combination comprising at least one of the foregoing.

Embodiment 7. The method as in any prior embodiment, further comprising activating the crosslinking agent with the acid to facilitate the formation of the polymerized chitosan.

Embodiment 8. The method as in any prior embodiment, further comprising applying a shut-in period to allow the polymerized chitosan to form.

Embodiment 9. The method as in any prior embodiment, wherein the polymerized chitosan forms a film on a surface of the plurality of particles in the subterranean formation thus consolidating the plurality of particles in the subterranean formation.

Embodiment 10. The method as in any prior embodiment, wherein the treatment fluid comprises an aqueous based carrier, and the plurality of particles in the subterranean formation has a water-wet surface.

Embodiment 11. The method as in any prior embodiment, wherein the treatment fluid comprises an oil based carrier, and the plurality of particles in the subterranean formation has an oil-wet surface.

Embodiment 12. The method as in any prior embodiment, wherein the treatment fluid comprises about 5 to about 70 wt % of the encapsulated particles.

Embodiment 13. The method as in any prior embodiment, wherein the treatment fluid has a pH of greater than about 6.

Embodiment 14. The method as in any prior embodiment, wherein the encapsulated particles have an average particle size of about 10 nm to about 200 µm.

Embodiment 15. The method as in any prior embodiment, wherein the treatment fluid is introduced into the subterranean formation during a workover operation.

Embodiment 16. The method as in any prior embodiment, further comprising pumping a cleaning composition to clean the subterranean formation prior to introducing the treatment fluid comprising the encapsulated particles. The cleaning composition can comprise about 10 to about 20 vol. % of hydrochloric acid.

Embodiment 17. The method as in any prior embodiment, further comprising performing a downhole operation comprising one or more of the following: a hydraulic fracturing operation; an acidizing treatment; a gravel packing operation; or a flooding operation. In an embodiment, performing the downhole operation precedes introducing the treatment fluid.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The modifier "about" used in connection with a quantity is inclusive of the stated value and has the meaning dictated by the context (e.g., it includes the degree of error associated with measurement of the particular quantity). In an embodiment, the term "about" means that the value associated with about can vary by 10%. As used herein, size means largest dimension. Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of treating a subterranean formation penetrated by a wellbore, the method comprising:

introducing into the subterranean formation a treatment fluid comprising encapsulated particles having a core of a crosslinking agent and a shell of a chitosan encapsulant disposed on the core;

releasing the crosslinking agent from the encapsulated particles with an acid;

reacting the released crosslinking agent with the chitosan encapsulant or a derivative thereof forming a polymerized chitosan; and consolidating a plurality of particles in the subterranean formation with the polymerized chitosan.

2. The method of claim 1, wherein the crosslinking agent comprises an oxycellulose, a tripolyphosphate, a sulfate, a citrate, or a combination comprising at least one of the foregoing.

3. The method of claim 1, wherein the acid breaks the shell of the chitosan encapsulant thus releasing the crosslinking agent.

4. The method of claim 3, wherein the acid is pumped downhole before the treatment fluid is introduced into the subterranean formation.

5. The method of claim 3, wherein the acid is pumped downhole after the treatment fluid is introduced into the subterranean formation.

6. The method of claim 1, wherein the acid comprises hydrochloric acid, acetic acid, formic acid, lactic acid, sulfuric acid, nitric acid, or a combination comprising at least one of the foregoing.

7. The method of claim 1, further comprising activating the crosslinking agent with the acid to facilitate the formation of the polymerized chitosan.

8. The method of claim 1, further comprising applying a shut-in period to allow the polymerized chitosan to form.

9. The method of claim 1, wherein the polymerized chitosan forms a film on a surface of the plurality of particles in the subterranean formation thus consolidating the plurality of particles in the subterranean formation.

10. The method of claim 1, wherein the treatment fluid comprises an aqueous based carrier, and the plurality of particles in the subterranean formation has a water-wet surface.

11. The method of claim 1, wherein the treatment fluid comprises an oil based carrier, and the plurality of particles in the subterranean formation has an oil-wet surface.

12. The method of claim 1, wherein the treatment fluid comprises about 5 to about 70 wt% of the encapsulated particles.

13. The method of claim 1, wherein the treatment fluid has a pH of greater than about 6.

14. The method of claim 1, wherein the encapsulated particles have an average particle size of about 10 nm to about 200 μm.

15. The method of claim 1, wherein the treatment fluid is introduced into the subterranean formation during a workover operation.

16. The method of claim 1, further comprising pumping a cleaning composition to clean the subterranean formation prior to introducing the treatment fluid comprising the encapsulated particles.

17. The method of claim 16, wherein the cleaning composition comprises about 10 to about 20 vol.% of hydrochloric acid.

18. The method of claim 1, further comprising performing a downhole operation comprising one or more of the following: a hydraulic fracturing operation; an acidizing treatment; a gravel packing operation; or a flooding operation.

19. The method of claim 18, wherein performing the downhole operation precedes introducing the treatment fluid.

20. The method of claim 1, wherein the treatment fluid has a pH of greater than about 7.

21. The method of claim 1, wherein the shell consists of the chitosan encapsulant.

22. The method of claim 1, wherein the core consists of the crosslinking agent.

23. The method of claim 1, wherein the encapsulated particles consist of a core of a crosslinking agent and a shell of a chitosan encapsulant disposed on the core.

* * * * *